US008221567B2

(12) United States Patent
Tate et al.

(10) Patent No.: US 8,221,567 B2
(45) Date of Patent: Jul. 17, 2012

(54) FILTER MEDIA AND SYSTEM AND METHOD OF MANUFACTURING THE SAME

(75) Inventors: Jason LaMarr Tate, Bessemer City, NC (US); Kim Kelly Lee, Gastonia, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 494 days.

(21) Appl. No.: 12/480,494

(22) Filed: Jun. 8, 2009

(65) Prior Publication Data

US 2010/0307659 A1    Dec. 9, 2010

(51) Int. Cl.
*B32B 37/00*    (2006.01)

(52) U.S. Cl. ........ 156/73.1; 156/210; 156/292; 210/348

(58) Field of Classification Search .................. 156/73.1, 156/210, 292, 580.1, 580.2; 264/442, 443, 264/444, 445; 428/59; 210/232, 348
See application file for complete search history.

(56) References Cited

U.S. PATENT DOCUMENTS

| | | | |
|---|---|---|---|
| 5,089,202 A | 2/1992 | Lippold | |
| 5,782,791 A | 7/1998 | Peterson et al. | |
| 5,846,360 A | 12/1998 | Gil | |
| 5,868,889 A | 2/1999 | Kahler | |
| 5,891,208 A | 4/1999 | Gil | |
| 6,743,317 B2 | 6/2004 | Wydeven | |
| 6,773,590 B2 | 8/2004 | Prutkin | |
| 6,863,758 B1 | 3/2005 | Altmeyer et al. | |
| 2002/0017366 A1* | 2/2002 | Inagaki et al. | ............. 156/379.7 |
| 2003/0230062 A1 | 12/2003 | Kubokawa et al. | |
| 2004/0011204 A1 | 1/2004 | Both | |
| 2006/0107640 A1 | 5/2006 | Nelson | |
| 2006/0278342 A1 | 12/2006 | Baierl et al. | |
| 2007/0089828 A1 | 4/2007 | Treier et al. | |
| 2007/0180803 A1 | 8/2007 | Sundet et al. | |
| 2007/0289265 A1 | 12/2007 | Coulonvaux et al. | |

FOREIGN PATENT DOCUMENTS

| | | |
|---|---|---|
| EP | 1731297 B1 | 7/2007 |
| EP | 1815966 A2 | 8/2007 |
| WO | WO-9633001 A1 | 10/1996 |
| WO | WO-2006/014941 | 2/2006 |

OTHER PUBLICATIONS

International Search Report dated Jan. 17, 2011 relating to International Application No. PCT/US2010/037792.

* cited by examiner

*Primary Examiner* — James Sells
(74) *Attorney, Agent, or Firm* — Honigman Miller Schwartz and Cohn LLP (57) ABSTRACT

Filter media and a method for manufacturing filter media is disclosed. The filter media includes a corrugated porous filter media layer including a top surface and a bottom surface, wherein the corrugated porous filter media layer includes one or more peaks separated by valleys, a second porous filter media layer including a top surface and a bottom surface, the valleys of the corrugated porous filter media proximate the second porous filter media layer, and an ultrasonically weldable material disposed between one or more of the valleys of the corrugated porous filter media layer and the top surface of the second porous filter media layer.

8 Claims, 10 Drawing Sheets

FILTER MEDIA AND SYSTEM AND METHOD OF MANUFACTURING THE SAME

FIELD

The invention relates to filters.

BACKGROUND

Various filters are known in the art for filtering fluid as it passes through a fluid path. Filters include, in part, filter media which removes impurities from a fluid, such as, for example, oil or fuel that passes through filter media.

In most applications, either the filter or the filter media associated therewith must be periodically replaced to reduce the potential of developing unacceptably high impedance in the fluid path flow restriction.

While known filters have proven to be acceptable for various applications, such conventional filters are nevertheless susceptible to improvements that may enhance their overall performance and cost. Therefore, a need exists to develop improved filters that advance the art.

BRIEF DESCRIPTION OF THE DRAWINGS

The present disclosure will now be described, by way of example, with reference to the accompanying drawings, in which.

DETAILED DESCRIPTION

The Figures illustrate exemplary embodiments of filter media and a system and method for manufacturing the same in accordance with embodiments of the invention and based on the foregoing, it is to be generally understood that the nomenclature used herein is simply for convenience and the terms used to describe the invention should be given the broadest meaning by one of ordinary skill in the art.

Figure 1:
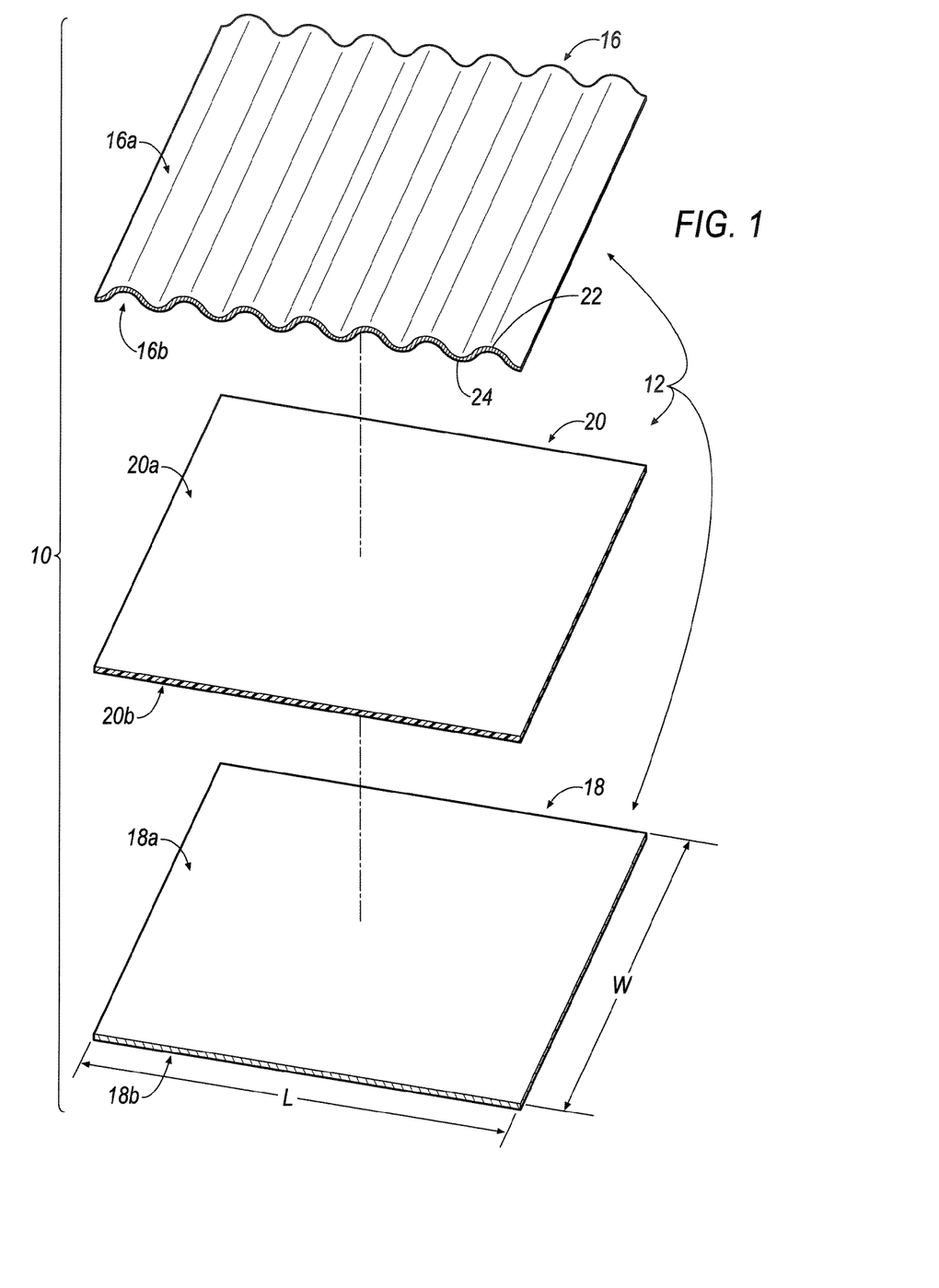
FIG. 1 is an exploded, perspective view of filter media in accordance with an exemplary embodiment of the invention.
Figure 2:
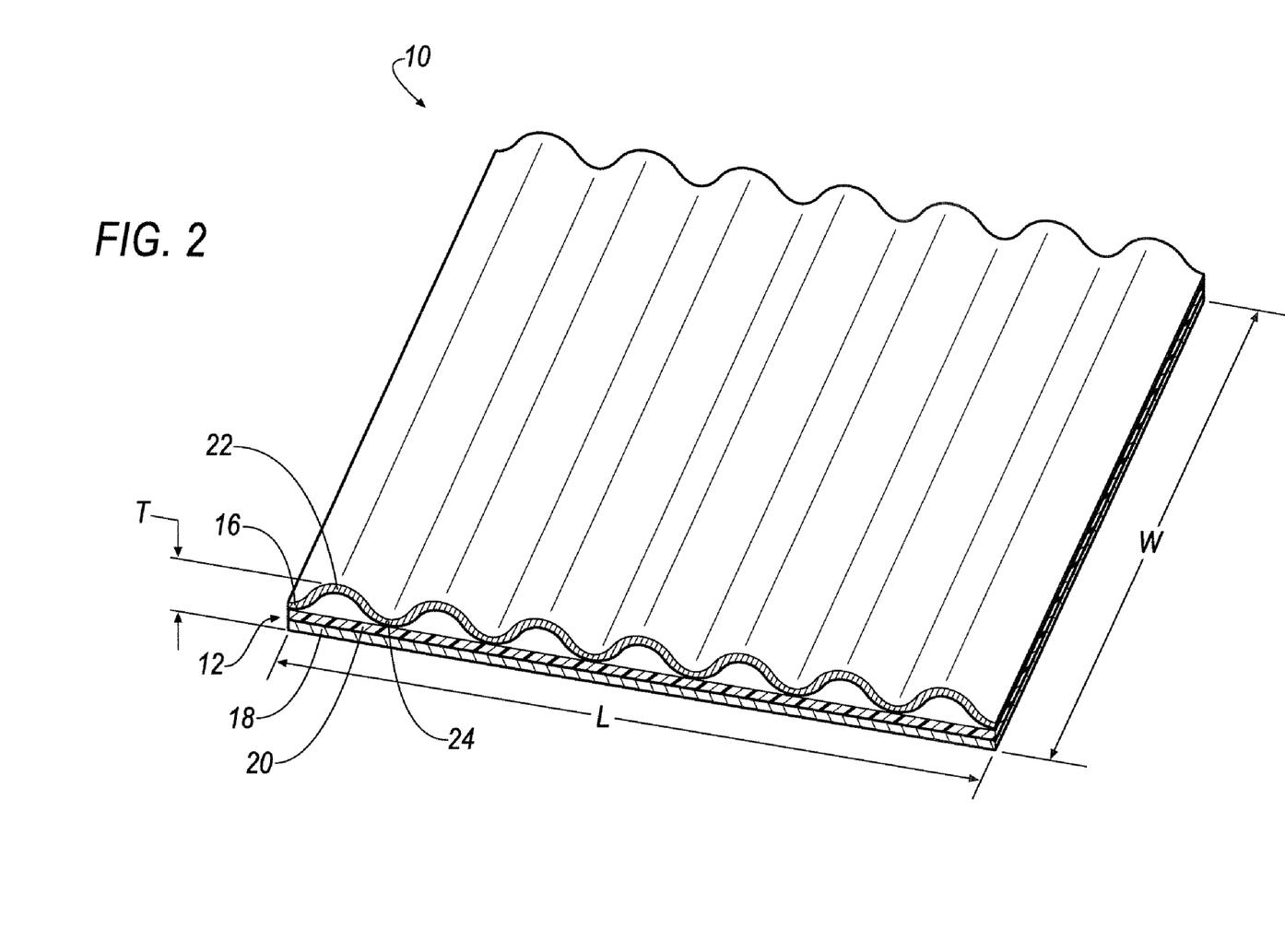
FIG. 2 is an assembled, perspective view of the filter media of FIG. 1 in accordance with an exemplary embodiment of the invention.

Referring to FIGS. 1 and 2, filter media is shown generally at 10 in accordance with an exemplary embodiment of the invention. In an embodiment, the filter media 10 includes at least two layers 12 that define a length, L, and a width, W, of the filter media 10.

Figure 3:
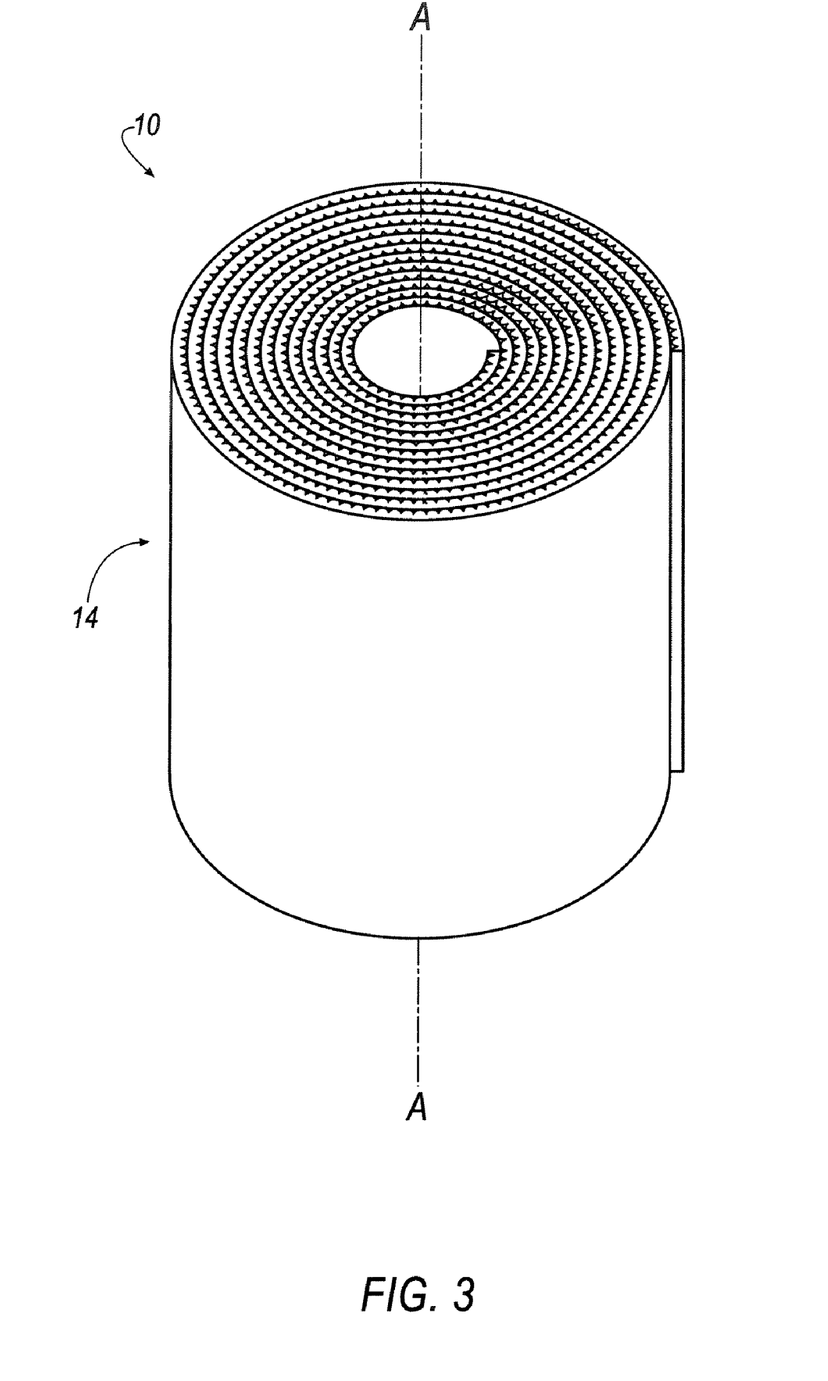
FIG. 3 is a perspective view of the filter media of FIG. 2 that is arranged to define a body of filter media in accordance with an exemplary embodiment of the invention
Figure 7A:
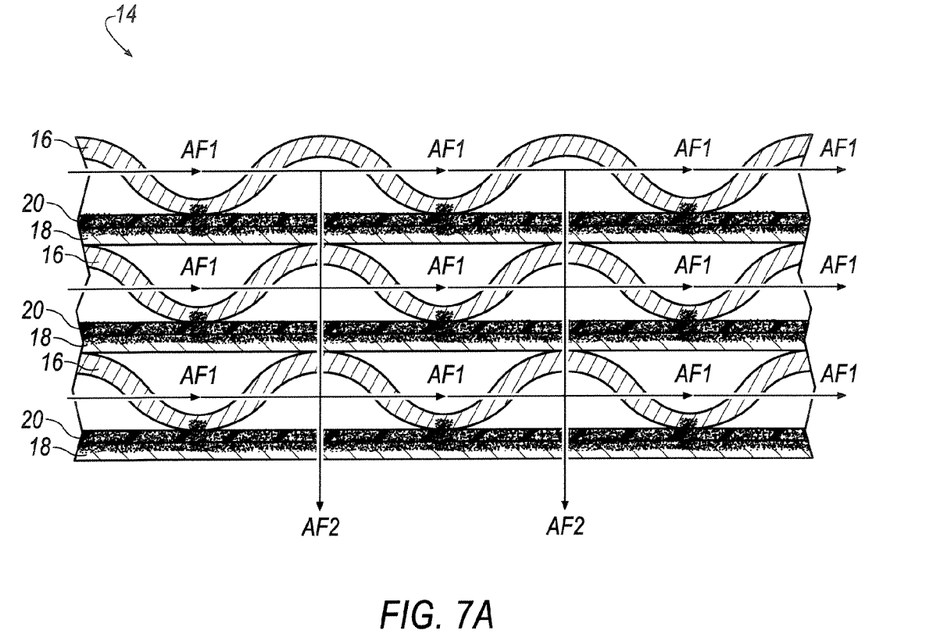
FIG. 7A is a cross-sectional view of a body of filter media including filter media of FIG. 5A in accordance with an embodiment of the invention.
Figure 7B:
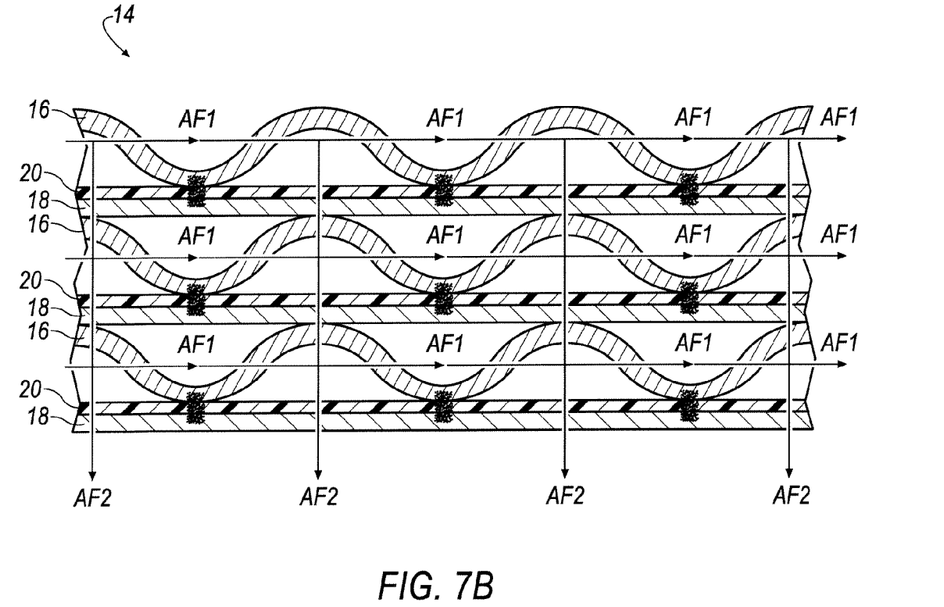
FIG. 7B is a cross-sectional view of a body of filter media including filter media of FIG. 5B in accordance with an embodiment of the invention.
Figure 12:
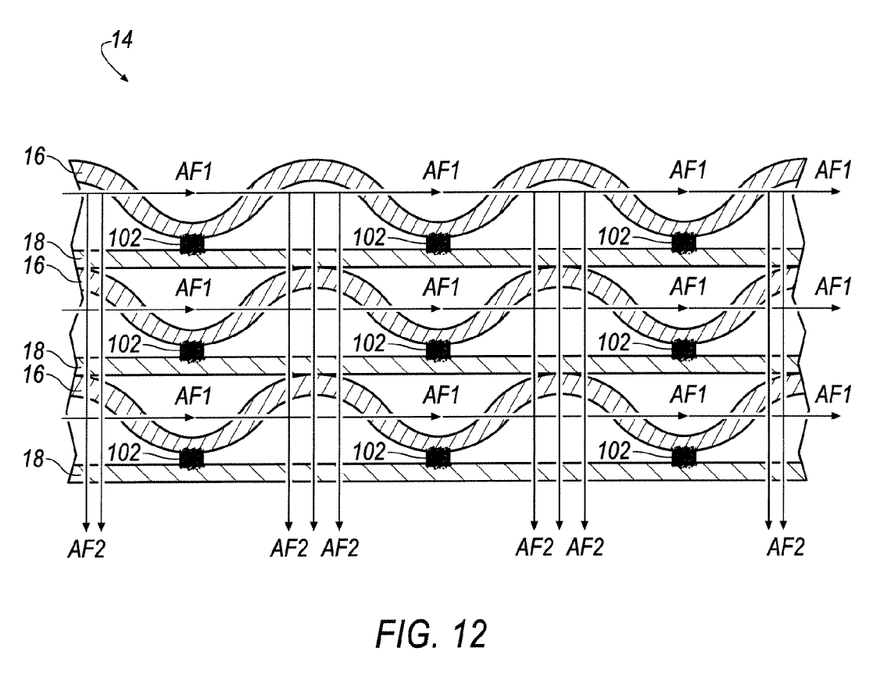
FIG. 12 is a cross-sectional view of a body of filter media including filter media of FIG. 11 in accordance with an embodiment of the invention.

Once the layers 12 are assembled, for example, as depicted in FIG. 2, the filter media 10 is further defined by a height/thickness, T. As seen in FIG. 3, for example, the filter media 10 may then be formed into any desirable shape, by, for example, rolling the filter media 10 about an axis, A-A, to define a coiled body 14 of filter media 10. In an embodiment, the body 14 may include a substantially cylindrical shape having a substantially circular cross-section; however, it will be appreciated that the body 14 may include any desirable size, shape or cross-section that includes, for example, a cone, oval, rectangle or the like. In an embodiment, the body 14 may be utilized to filter any type of fluid according to one or more air-flow paths, AF1 and AF2 that are seen, for example, in FIGS. 7A, 7B and 12, which will be described in greater detail in the foregoing disclosure.

With reference to the embodiment depicted in FIG. 1, layers 12 may include three layers, which are shown generally at 16, 18 and 20, respectively. In an embodiment, a first layer may include, for example, a fluted or corrugated porous filter media layer, which is shown generally at 16. In an embodiment, a second layer may include, for example, a second porous filter media layer, which is shown generally at 18. In an embodiment, this layer may be planar, flat, lightly corrugated, and the like each of which will become appreciated by one of ordinary skill in the art after considering this disclosure.

In an embodiment, an intermediate, third layer may include, for example, a sheet or layer of adhesive, which is shown generally at 20. It is to be appreciated that one or both of media 16 and 18 may include adhesive pre-disposed thereon or adhesive may be added to one or both of media 16 and 18 during the process described herein using, for example, a spun-bond process whereby molten adhesive material is applied to one or both of media 16 and 18, in each case the addition of adhesive to media 16 and/or 18 may be provided in addition, or replace, adhesive layer 20.

In an embodiment, the filter media layers 16, 18 may comprise any desirable material, such as, for example, cellulose filter media. In an embodiment, the adhesive layer 20 may comprising any desirable material, such as, for example, polyamide. Although embodiments of materials are described above, it will be appreciated that the above materials are directed to an embodiment of the invention and do not limit or restrict practicing of the invention to a particular type of material.

In an embodiment, the corrugated porous filter media layer 16 may include an upper surface 16a and a lower surface 16b. In an embodiment, the corrugated porous filter media layer 16 may define peaks 22 separated between valleys 24 that extend substantially in parallel along the length, L, of the corrugated porous filter media layer 16.

In an embodiment, the second layer of porous filter media layer 18 may also include an upper surface 18a and a lower surface 18b. Further, in an embodiment, the sheet of adhesive 20 may also include, for example, an upper surface 20a and a lower surface 20b.

Figure 4:
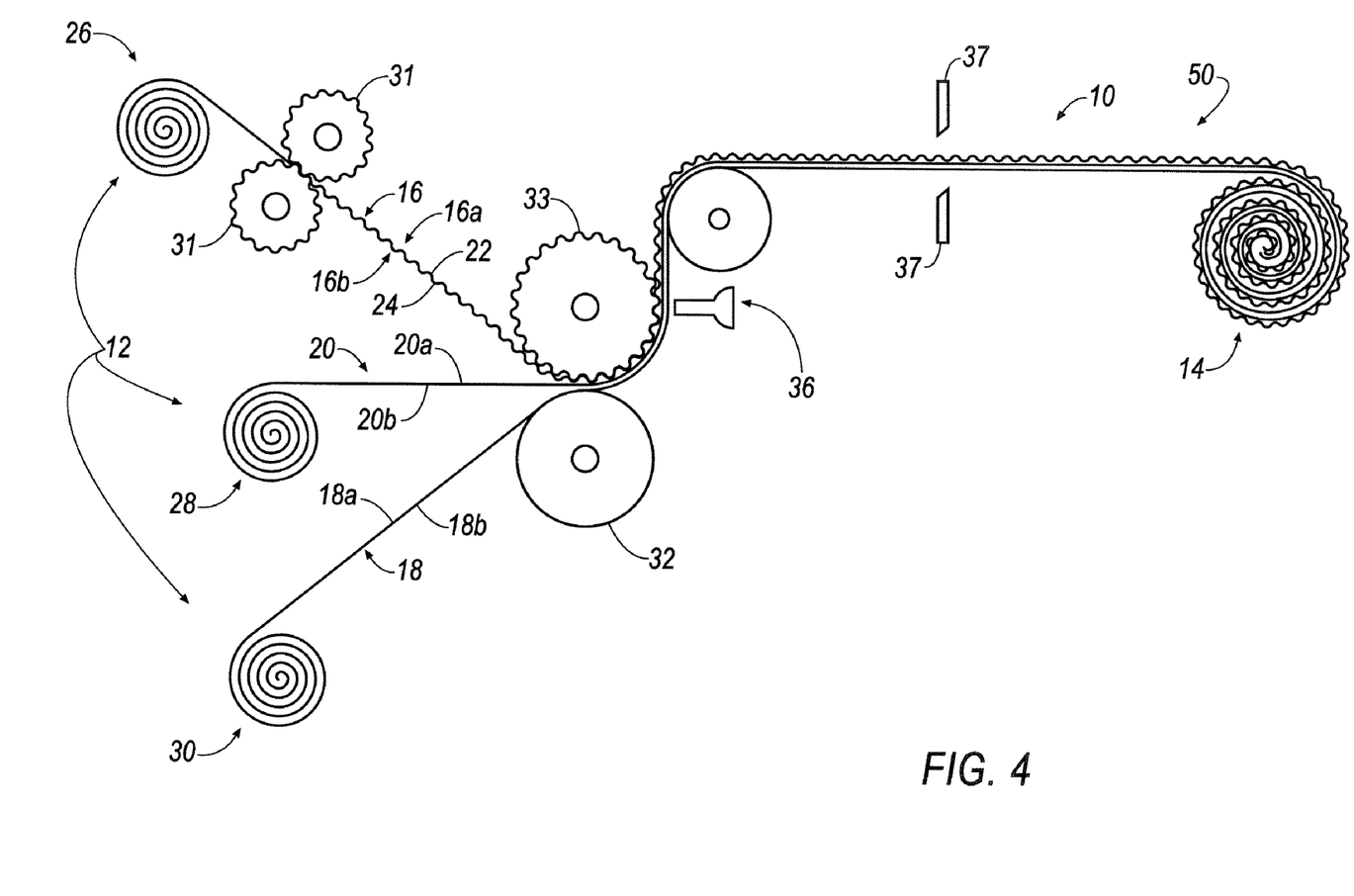
FIG. 4 is a side view of an apparatus/system for manufacturing the filter media of FIG. 1 in accordance with an exemplary embodiment of the invention.
Figure 5:
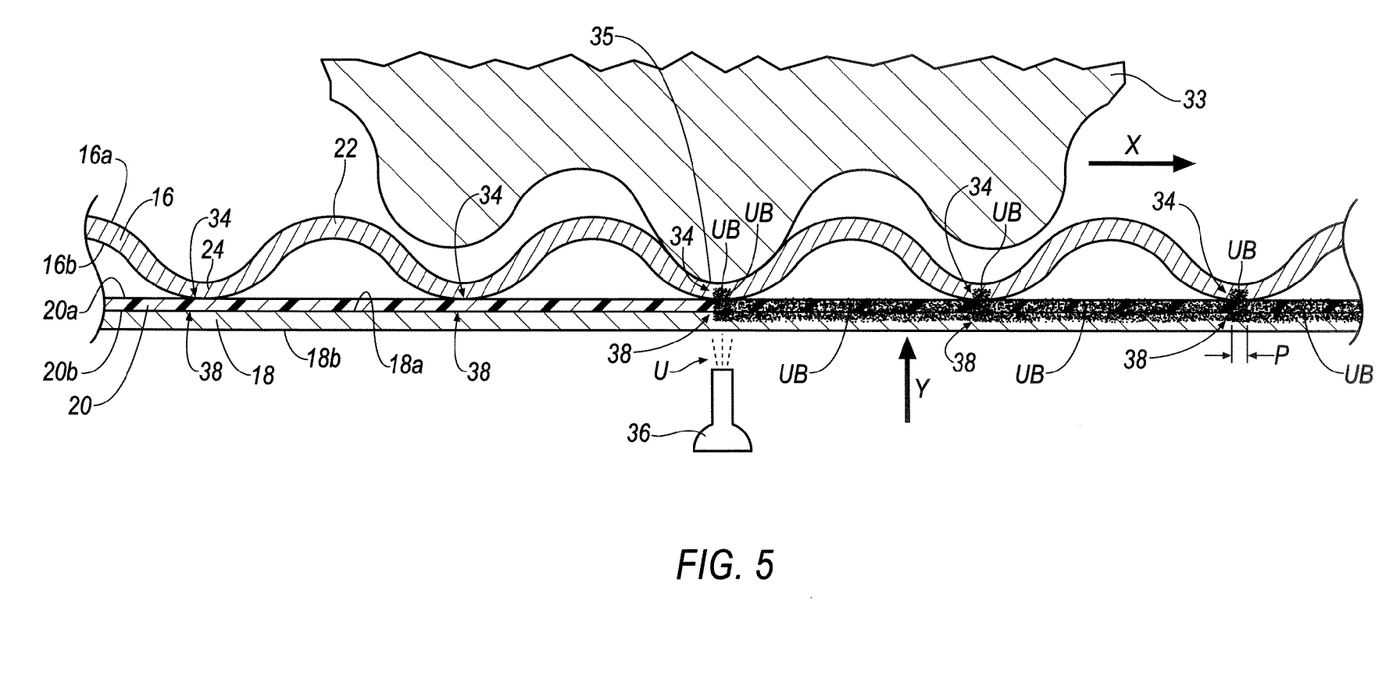
FIG. 5 is a side/cross-sectional view of the filter media according to line 5 of FIG. 4 in accordance with an exemplary embodiment of the invention.
Figure 6:
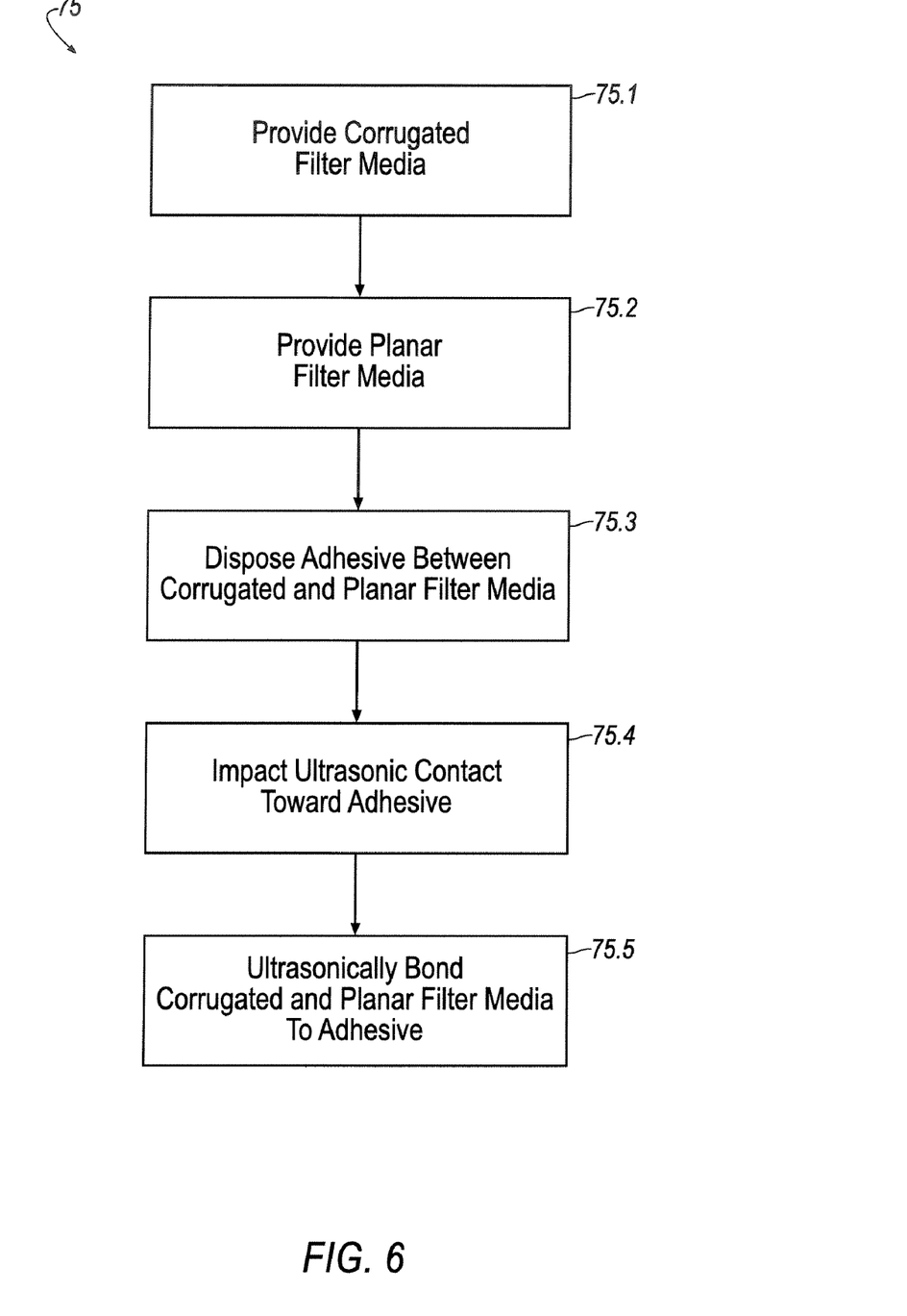
FIG. 6 is a block diagram illustrating a method of manufacturing the filter media of FIG. 1 in accordance with an exemplary embodiment of the invention.

Referring to FIGS. 4-6, an apparatus/system 50 (see, e.g., FIG. 4) and method 75 (see, e.g., FIG. 6) for manufacturing the filter media 10 is shown in accordance with an embodiment of the invention. In an embodiment, each of the layers 12 may be provided from a coiled roll, which are shown, respectively, at 26-30. In an embodiment, the peaks 22 and valleys 24 of the corrugated porous filter media layer 16 may be formed by a pair of crimping rollers 31 that receive a planar porous filter media layer from the coiled roll 26.

In an embodiment, layers 12 (see, e.g., steps 75.1 and 75.2) may be sandwiched or moved adjacent one another by, for example, a pair of nip rollers 32. As illustrated, the adhesive layer 20 of the layers 12 is laminated by/disposed between the filter media layers 16, 18 (see, e.g., step 75.3).

When the layers 12 are sandwiched or moved adjacent one another by disposing the adhesive layer 20 between the filter media layers 16, 18 as described above, the upper surface 20a of the adhesive layer 20 may be disposed substantially adjacent one or more portions of the lower surface 16b of the corrugated porous filter media layer 16, which is shown generally at 34 in FIG. 5. Further, when the layers 12 are sandwiched or moved adjacent one another, the lower surface 20b of the adhesive layer 20 may be disposed substantially adjacent the upper surface 18a of filter media layer 18.

Referring now to FIG. 5, in an embodiment, once the adhesive layer 20 is disposed adjacent the one or more portions 34 of the lower surface 16b of the corrugated porous filter media layer 16 and the upper surface 18a of the porous filter media layer 18, each of the corrugated porous filter media layer 16 and the filter media layer 18 are selectively, ultrasonically bonded, or welded, to one another via selective ultrasonic activation of the adhesive layer 20. In an embodiment, the this ultrnsonic activation is accomplished by a sonitrode 36, as shown in FIGS. 4 and 5.

With reference to FIGS. 4 and 5, in an embodiment, a roller 33 is provided having splines 35. In an embodiment, the splines 35 of roller 33 interactingly engage the corrugated layer 16 and the sonitrode is arranged proximate a spline 35 such that as the corrugated layer 16, along with the neighboring adjacent layers 18, 20 pass between the sonitrode and the roller 33. In an embodiment, the sonitrode is arranged to activate the adhesive layer 20 when a spline 35 of roller engages a valley 24 of filter media layer 16. In an embodiment, and as depicted, the sonitrode activates the adhesive layer at the desired locations and resultingly attaches the valleys 24 of filter media layer 16 with filter media layer 18 due to the intermittent activation of the adhesive layer 20 by the sonitrode.

In an embodiment, for example, the sonitrode 36 imparts ultrasonic waves, U (see, e.g., step 75.4), according to the direction of the arrow, Y, for activating the adhesive layer 20 as the layers 12 are reeled according to the direction of the arrow, X. In an embodiment, as seen in FIG. 5A, it will be appreciated that the ultrasonic waves, U, may be continuously emitted as the layers 12 are reeled according to the direction of the arrow, X, in order to "activate"/ultrasonically bond, UB, an entire length, L, and width, W, of the adhesive layer 20.

The ultrasonic waves, U, may be emitted to at least ultrasonically bond, UB, a plurality of portions, P, of the filter media 10 (see, e.g., step 75.5). In an embodiment, the plurality of portions, P, of the filter media 10 are generally defined as the location of the filter media 10 where upper surface 20a of the adhesive layer 20 is disposed substantially adjacent at least the one or more portions 34 of the lower surface 16b of the corrugated porous filter media layer 16; as such, when the adhesive layer 20 is activated at least proximate the portion 34 of the lower surface 16b of the corrugated porous filter media layer 16, a portion 38 of the upper surface 18a of the filter media layer 18 that is arranged substantially opposite the portion 34 of the lower surface 16b of the corrugated porous filter media layer 16 will also be ultrasonically bonded, UB, with the adhesive layer 20. Accordingly, in an embodiment, the plurality of portions, P, of the filter media 10 may be generally defined by the portions 34, 38 of each of the filter media layers.

As seen in FIG. 4, as the adhesive layer 20 is activated as described above, the layers 12 are said to be ultrasonically-bonded, UB, at least proximate the portions 34, 38 of the layers 16, 18 to form the filter media 10. The filter media 10 may be further advanced according to the direction of the arrow, X, to be reeled in the form of a body 14 having any desirable shape, size, cross-section or configuration as described above. In an embodiment, as the body 14 is formed, it will be appreciated that the bottom surface 18b of the filter media layer 18 is disposed adjacent the top surface 16a of the corrugated porous filter media layer 16 proximate the one or more peaks 22 (see, e.g., FIGS. 7A, 7B and 12).

Further, in an embodiment, the apparatus/system 50 may include one or more cutting portions 37 that sever the width, W, of the filter media 10 in order to prepare individual bodies 14 for later use as a component of a filter element. However, in an embodiment, the one or more knives/cutting portions 37 may not be included/utilized such that the apparatus/system 50 forms a substantially large body 14 that is later utilized as a source of filter media 10 to later construct individual filter elements.

Once formed into the body 14 as described above, the filter media 10 is said to be wound upon itself. A segment of the wound filter media 10 is shown, for example, in FIGS. 7A and 7B. The body 14 may be utilized to filter a fluid according to one or more fluid flow paths that are shown generally at AF1 and AF2.

Figure 8:
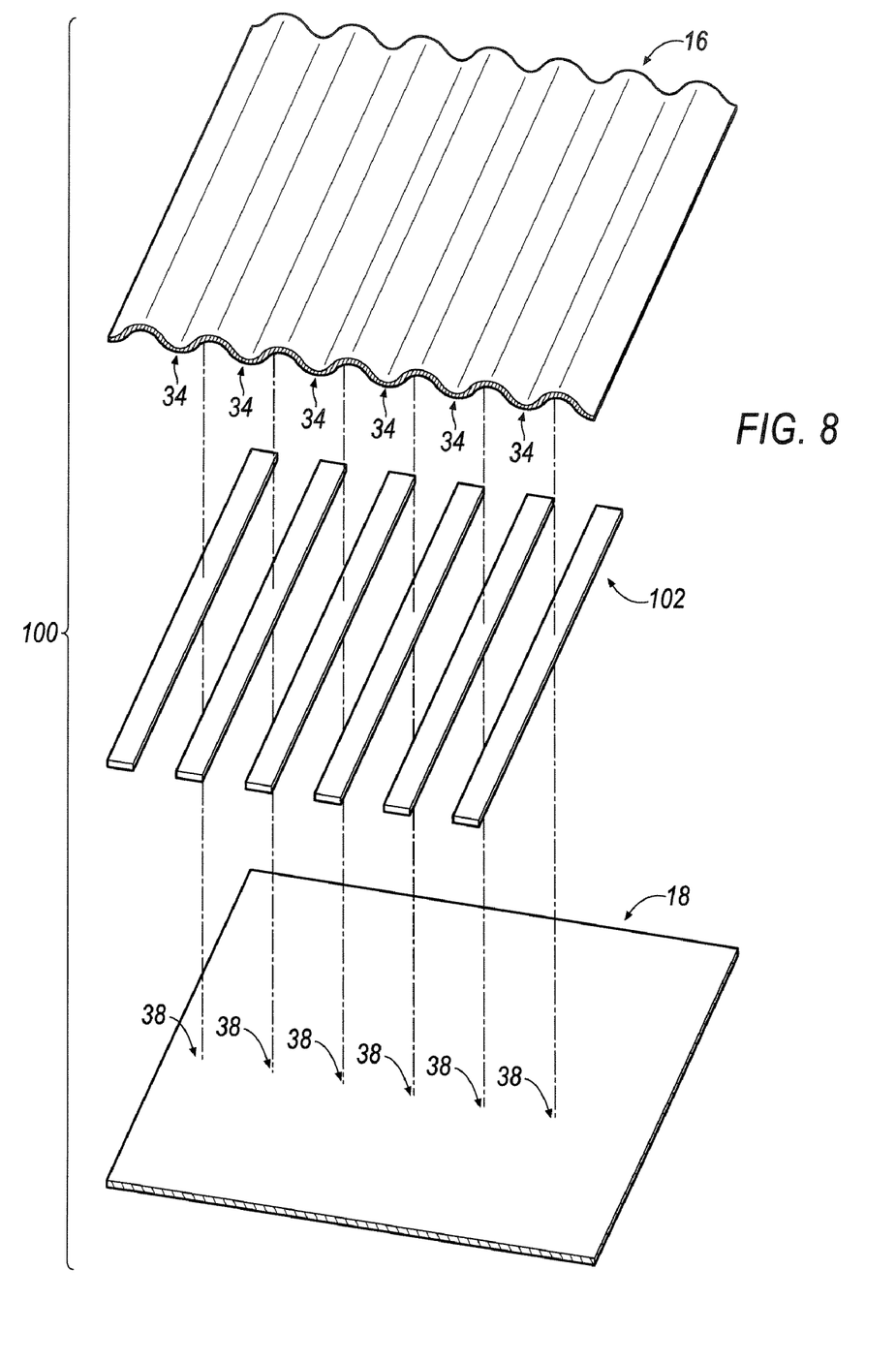
FIG. 8 is an exploded, perspective view of filter media in accordance with an exemplary embodiment of the invention.

Although an embodiment of the invention has been described above to include a layers 12, it will be appreciated that the filter media 10 is not limited to include a layers 12 having any particular number, size, shape or configuration. For example, as seen in FIG. 8, filter media is shown generally at 100 in accordance with an embodiment of the invention.

In an embodiment, the filter media 100 may include the corrugated porous filter media layer 16 and the filter media layer 18. However, rather than including an adhesive layer 20, the filter media 100 may include one or more adhesive beads or strips 102 arranged at least proximate each of the portions 34, 38.

In an embodiment, the one or more adhesive beads or strips 102 may include a substantially solid length of material that is similar to that of the adhesive layer 20 described above. As such, the one or more adhesive beads or strips 102 may be located at one or more of the portions 34, 38 by way of any desirable methodology, such as, for example, an automatic or manual application.

Figures 9, 10:
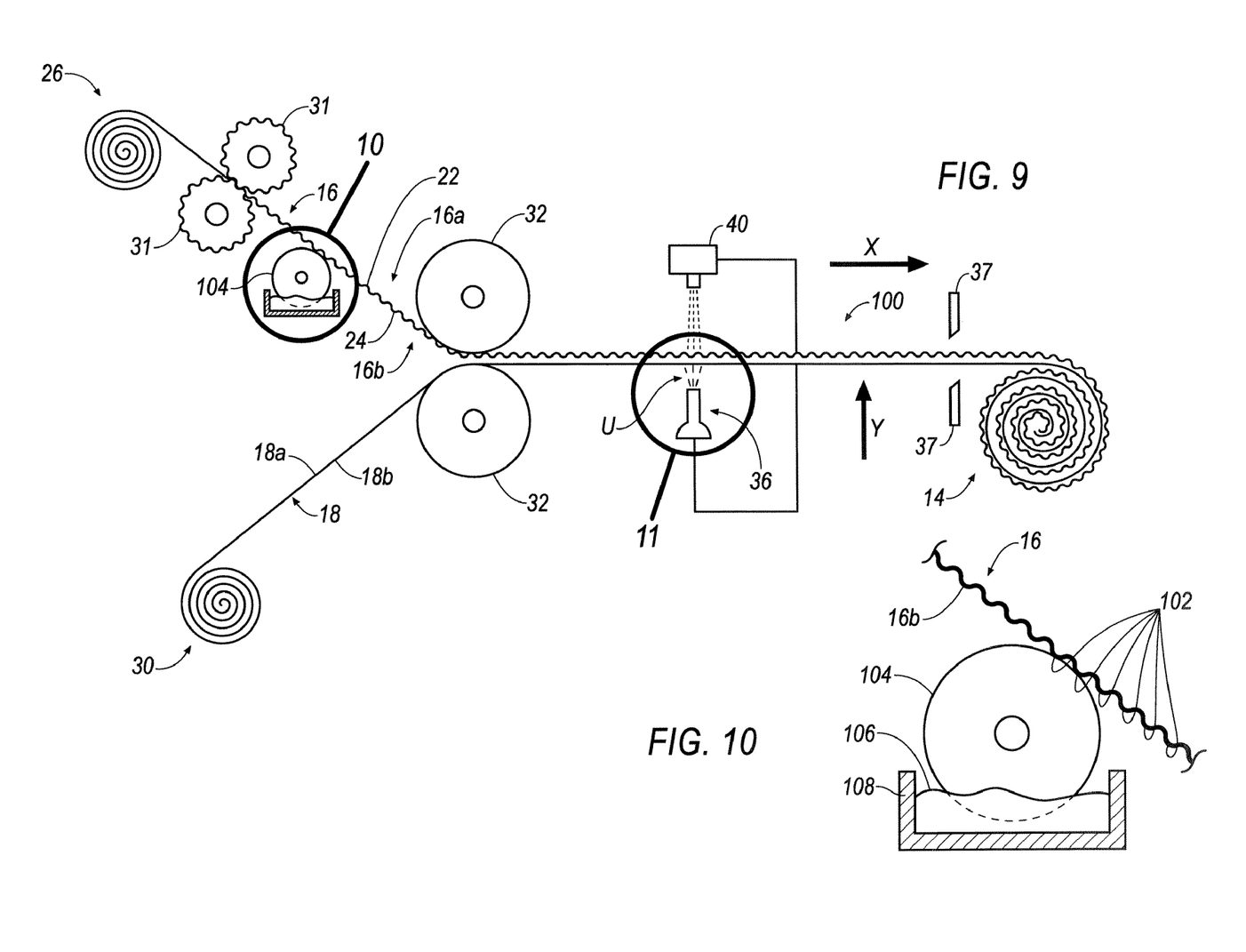
FIG. 9 is a side view of an apparatus/system for manufacturing the filter media of FIG. 8 in accordance with an exemplary embodiment of the invention.
FIG. 10 is an enlarged view of a component of the apparatus/system and a layer of the filter media according to line 10 of FIG. 9 in accordance with an exemplary embodiment of the invention.

However, in an alternative embodiment, as seen at FIGS. 9-10, an apparatus/system 150 may apply the one or more adhesive beads or strips 102 with, for example, a roller 104. In an embodiment, the roller 104 may apply/"paint" a liquid/non-solid adhesive material 106 to the lower surface 16b of the corrugated porous filter media layer 16. In an embodiment, the roller 104 may include an absorbent material (e.g. sponge) that, for example, wicks the adhesive 106 from a bath 108. Accordingly, in an embodiment, the roller 104 may be arranged to at least be brought into contact with the lower surface 16b proximate the valleys 24/one or more portions 34 of the corrugated porous filter media layer 16 to define the plurality of adhesive beads or strips 102.

Figure 11:
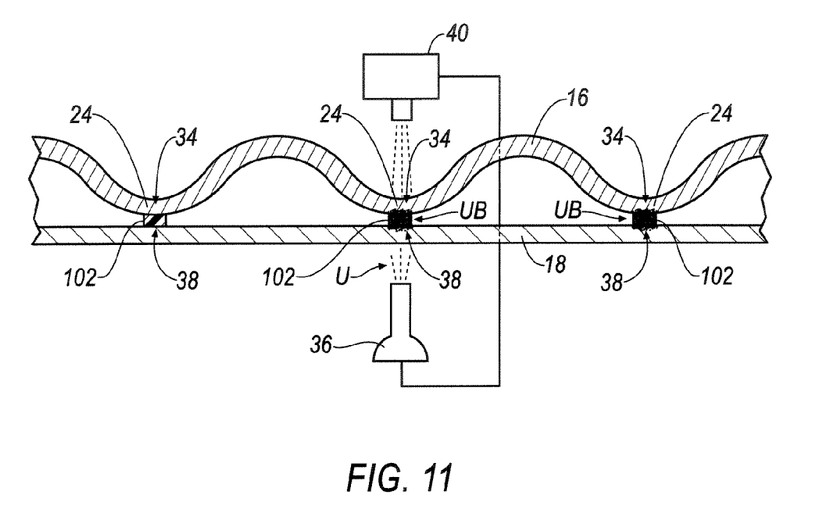
FIG. 11 is a side/cross-sectional view of the filter media according to line 11 of FIG. 9 in accordance with an exemplary embodiment of the invention.

Irrespective of a substantially solid or liquid application of the one or more adhesive beads or strips 102, as seen in FIG. 11, the ultrasonic horn 36 may emit the ultrasonic waves, U, to ultrasonically bond, UB, the layers 16, 18 proximate the portions 34, 38 by activating the one or more adhesive beads or strips 102. In an embodiment, the apparatus/system 150 may also include the sensor 40. Once formed into the body 14 as described above, the filter media 100 is wound upon itself as shown, for example, in FIG. 12. The body 14 may be utilized to filter a fluid according to one or more fluid flow paths that are shown generally at AF1 and AF2. Because the filter media 100 includes one or more adhesive beads or strips 102 and not an adhesive layer 20, it will be appreciated that the fluid flow path, AF2, may be improved over that shown in FIGS. 7A and 7B due to the lack of a complete layer of adhesive disposed between the filter media layers 16, 18.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. Filter media, comprising
a corrugated porous filter media layer including a top surface and a bottom surface, wherein the corrugated porous filter media layer includes one or more peaks separated by valleys;
a second porous filter media layer including a top surface and a bottom surface, the valleys of the corrugated porous filter media proximate the second porous filter media layer; and
an ultrasonically weldable material layer disposed between the valleys of the corrugated porous filter media layer and the top surface of the second porous filter media layer, wherein the corrugated porous filter media layer, the second porous filter media layer and the ultrasonically weldable material layer collectively form:
at least one ultrasonic bond that joins the corrugated porous filter media to the second porous filter media layer, wherein the at least one ultrasonic bond includes:
a portion of the lower surface of the corrugated porous filter media layer,
a portion of the upper surface of the second porous filter media layer, and
a thickness of the ultrasonically weldable material layer arranged between and ultrasonically bonded to each of: the portion of the lower surface of the corrugated porous filter media layer and the portion of the upper surface of the second porous filter media layer.

2. The filter structure according to claim 1, wherein one or more of the corrugated porous filter media layer and the second porous filter media layer includes
cellulose filter media.

3. The filter structure according to claim 1, wherein the ultrasonically weldable material layer includes
polyamide.

4. The filter structure according to claim 1, wherein the ultrasonically weldable material layer includes one or more adhesive beads or one or more adhesive strips.

5. A method for assembling a filter structure, comprising the steps of:
providing: (1) a corrugated porous filter media layer having a top surface and a bottom surface, wherein the corrugated porous filter media includes one or more peaks separated by valleys, (2) a second porous filter media layer including a top surface and a bottom surface, and (3) a sonically-weldable adhesive layer;
arranging the sonically-weldable adhesive layer between the bottom surface of the corrugated porous filter media layer and the top surface of the second filter media layer, wherein the top surface of the sonically-weldable adhesive layer is disposed adjacent to the one or more valleys; and
imparting ultrasonic energy to the sonically-weldable adhesive for
activating the sonically-weldable adhesive thereby forming one or more ultrasonic bonds formed by: a portion of the lower surface of the corrugated porous filter media layer, a portion of the upper surface of the second porous filter media layer, and a thickness of the ultrasonically weldable material layer arranged between and ultrasonically bonded to each of: the portion of the lower surface of the corrugated porous filter media layer and the portion of the upper surface of the second porous filter media layer.

6. The method according to claim 5, wherein the forming one or more ultrasonic bonds step further comprises the sub-step of:
bonding at least a portion of the corrugated filter media layer to the second filter media layer via at least one of the one or more valleys to corresponding portions of the flat filter media layer.

7. The method according to claim 5, wherein the imparting ultrasonic energy to the sonically-weldable adhesive layer step includes the step of
continuously imparting ultrasonic energy to the sonically-weldable adhesive layer.

8. The method according to claim 5, wherein the imparting ultrasonic energy to the sonically-weldable adhesive step includes the step of:
intermittently imparting ultrasonic energy to the sonically-weldable adhesive layer.

* * * * *